United States Patent
Zoppitelli et al.

(10) Patent No.: US 6,176,136 B1
(45) Date of Patent: Jan. 23, 2001

(54) METHOD AND DEVICE FOR DETERMINING THE STATE OF A VIBRATING STRUCTURE OF A ROTARY WING AIRCRAFT

(75) Inventors: Elio Zoppitelli, Velaux; Alain Struzik, Aix-en-Provence, both of (FR)

(73) Assignee: Eurocopter, Marignane Cedex (FR)

( * ) Notice: Under 35 U.S.C. 154(b), the term of this patent shall be extended for 0 days.

(21) Appl. No.: 09/204,304

(22) Filed: Dec. 3, 1998

(30) Foreign Application Priority Data

Dec. 4, 1997 (FR) .................................................. 97 15291

(51) Int. Cl.[7] .................................................. G01H 1/00
(52) U.S. Cl. .................................................. 73/660
(58) Field of Search .............................. 73/593, 649, 658, 73/660

(56) References Cited

U.S. PATENT DOCUMENTS

| | | |
|---|---|---|
| 3,705,516 | 12/1972 | Reis . |
| 3,712,130 | 1/1973 | Weichbrodt et al. . |
| 4,181,024 * | 1/1980 | Leak et al. .............................. 73/660 |
| 4,751,657 | 6/1988 | Imam et al. . |
| 5,210,704 | 5/1993 | Husseiny . |
| 5,333,240 * | 7/1994 | Matsumoto et al. .................... 706/20 |
| 5,365,787 * | 11/1994 | Hernandez et al. .................... 73/660 |
| 5,724,271 * | 3/1998 | Bankert et al. ......................... 73/462 |
| 5,845,280 * | 12/1998 | Treadwell, III et al. ................ 707/8 |

FOREIGN PATENT DOCUMENTS

| | | |
|---|---|---|
| 0490805 | 6/1992 | (EP) . |
| 2474996 | 8/1981 | (FR) . |
| 2692668 | 12/1993 | (FR) . |

* cited by examiner

Primary Examiner—Max Noori
(74) Attorney, Agent, or Firm—Stevens, Davis, Miller & Mosher, L.L.P.

(57) ABSTRACT

The present invention relates to a method and to a device for determining the state of a vibrating structure of a rotary wing aircraft, while the latter is operating. The device includes sensors arranged on the vibrating structure and capable of measuring the values of vibrational parameters, and a calculation unit receiving the values measured by the sensors and calculating, from these and from estimated values of the vibrational parameters, a correlation coefficient, comparing the latter with a predefined range of values and deducing from this comparison the state of the vibrating structure.

16 Claims, 2 Drawing Sheets

METHOD AND DEVICE FOR DETERMINING THE STATE OF A VIBRATING STRUCTURE OF A ROTARY WING AIRCRAFT

BACKGROUND OF THE INVENTION

1. Field of the Invention

The present invention relates to a method and to a device for determining the state of a vibrating structure of a rotary wing aircraft, particularly a helicopter.

2. Description of the Related Art

More specifically, it is intended to determine whether said vibrating structure, which is subjected to at least one type of vibration, is in a normal state or in an abnormal state (which may be due to a malfunctioning of a component of said structure or of an element of the aircraft that is associated with and/or connected to this structure), while said rotary wing aircraft is operating.

Although not exclusively, the present invention is more particularly applied to determining the state of a system for the suspension of a transmission gearbox of said rotary wing aircraft, such a transmission gearbox being mounted between propulsion means and a lift rotor of said aircraft essentially longitudinally to the axis of said rotor and being suspended with respect to the fuselage of said aircraft. Such a suspension system, which is effective in attenuating vibration in roll, pitch and vertical oscillation, is described in patent FR-2 474 996 and comprises:

struts distributed radially around said transmission gearbox, the upper ends of which are connected to the upper part of the transmission gearbox, and the lower ends of which are articulated to suspension leaves;

a suspension means connecting the lower part of the transmission gearbox to the fuselage of the aircraft and in particular comprising said suspension leaves; and resonator means associated with said struts respectively.

SUMMARY OF THE INVENTION

To this end, said method for determining the state of a vibrating structure of a rotary wing aircraft, while the latter is operating, is noteworthy, according to the invention, in that:

a) n main vibrational modes of said vibrating structure are defined, n being an integer greater than or equal to 1;

b) p vibrational parameters, for example speeds, displacements, forces, accelerations and/or strains, that can be measured and that will enable the response of said n main vibrational modes to be estimated are defined on said structure, p being an integer greater than or equal to n. To achieve this, and to achieve step c), use is preferably made of a matrix which allows the p vibrational parameters to be estimated from the n fundamental modes and which is determined, either from an identification beforehand, or using known kinematic relationships;

c) estimated values of each of said p vibrational parameters are determined;

d) the values of said p vibrational parameters are measured while said rotary wing aircraft is operating;

e) a correlation coefficient is calculated from said estimated values and said measured values of the p vibrational parameters, preferably complex values;

f) said correlation coefficient is compared with a predefined range of values; and g) the state of said vibrating structure is deduced from the results of said comparison.

Thus, by virtue of the invention, it is possible to effectively determine the state (normal or abnormal) of said vibrating structure of the rotary wing aircraft while it is operating.

In effect:

if the correlation (defined by said correlation coefficient) is strong, that is to say if said correlation coefficient lies within said predetermined range of values which is formed accordingly, the only vibrations experienced by said vibrating structure are generated from said main vibrational modes defined in the aforementioned operation a). These vibrations are therefore justified and the vibrating structure is in its normal state;

otherwise, other undefined vibrations are generated in addition, and this reveals an abnormal state of said vibrating structure, these additional vibrations being due in particular to poor operation or a defect of the vibrating structure and/or of an element of the aircraft that is connected thereto.

In an advantageous embodiment, operations a) and b) are performed in a preliminary step, as is determining the means needed for determining said estimated values, and the remaining operations, particularly the acquisition of data and the processing, are performed in a subsequent step while said rotary wing aircraft is operating, which makes it possible to simplify and limit the processing performed while said aircraft is operating, particularly while it is in flight.

Furthermore, advantageously, said estimated values of the vibrational parameters are values measured on the vibrating structure while said rotary wing aircraft is operating, for a normal state of said vibrating structure.

Furthermore, said correlation coefficient may be predefined as a function of the state (particularly the setting) of the vibrating structure or alternatively it may be defined during at least one initial flight or an intervention on the vibrating structure.

In a first simplified embodiment, said correlation coefficient corresponds to the difference between a first term obtained from said estimated values and a second term obtained from said measured values.

Furthermore, in a second preferred embodiment:

said correlation coefficient Q is calculated from the expression:

$$Q = \left[ \frac{\sum i(Umi \times \overline{Uei})}{\sqrt{\left(\sum i\, Umi \times \overline{Umi}\right) \times \left(\sum i\, Uei \times \overline{Uei}\right)}} \right]$$

in which:

the Umi terms, with i varying from 1 to p, represent the measured values of the vibrational parameters;

the Uei terms, with i varying from 1 to p, represent the estimated values of the vibrational parameters; and $\overline{Umi}$ and $\overline{Uei}$ are the complex conjugates of Umi and Uei respectively; and/or said predefined range of values is preferably between 0.95 and 1.

The present invention is particularly applicable to a vibrating structure that corresponds to a system for the suspension of a transmission gearbox, like the aforementioned one.

In this case, advantageously, at least one of said vibrational parameters is measured on at least one of the following elements of said suspension system: a strut, a suspension leaf, a mass support and an oscillating mass of a resonator means, said resonator means comprising an oscillating mass connected by a mass support to a suspension leaf.

The present invention also relates to a device for implementing the aforementioned method.

According to the invention, said device is noteworthy in that it comprises:

sensors arranged on said vibrating structure and capable of measuring the values of said vibrational parameters; and preferably means which filter the values measured by said sensors, relative to a frequency bΩ, b being the number of blades of the rotary wing aircraft lift rotor and Ω being its rotational speed; and a calculation unit receiving the values measured by said sensors and determining, in the aforementioned way, from these and from estimated values of the vibrational parameters, the state of said vibrating structure.

BRIEF DESCRIPTION OF THE DRAWINGS

The figures of the appended drawing will make it easy to understand how the invention may be achieved. In these figures, identical references denote similar elements.

DETAILED DESCRIPTION OF THE PREFERRED EMBODIMENTS

Figure 1:
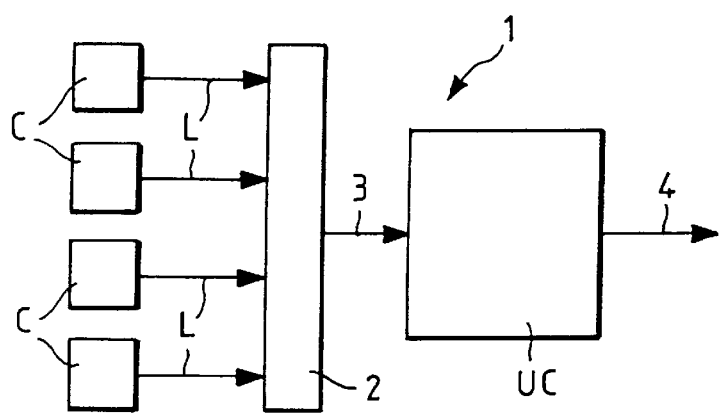
FIG. 1 is a block diagram of a device in accordance with the invention.
Figure 2:
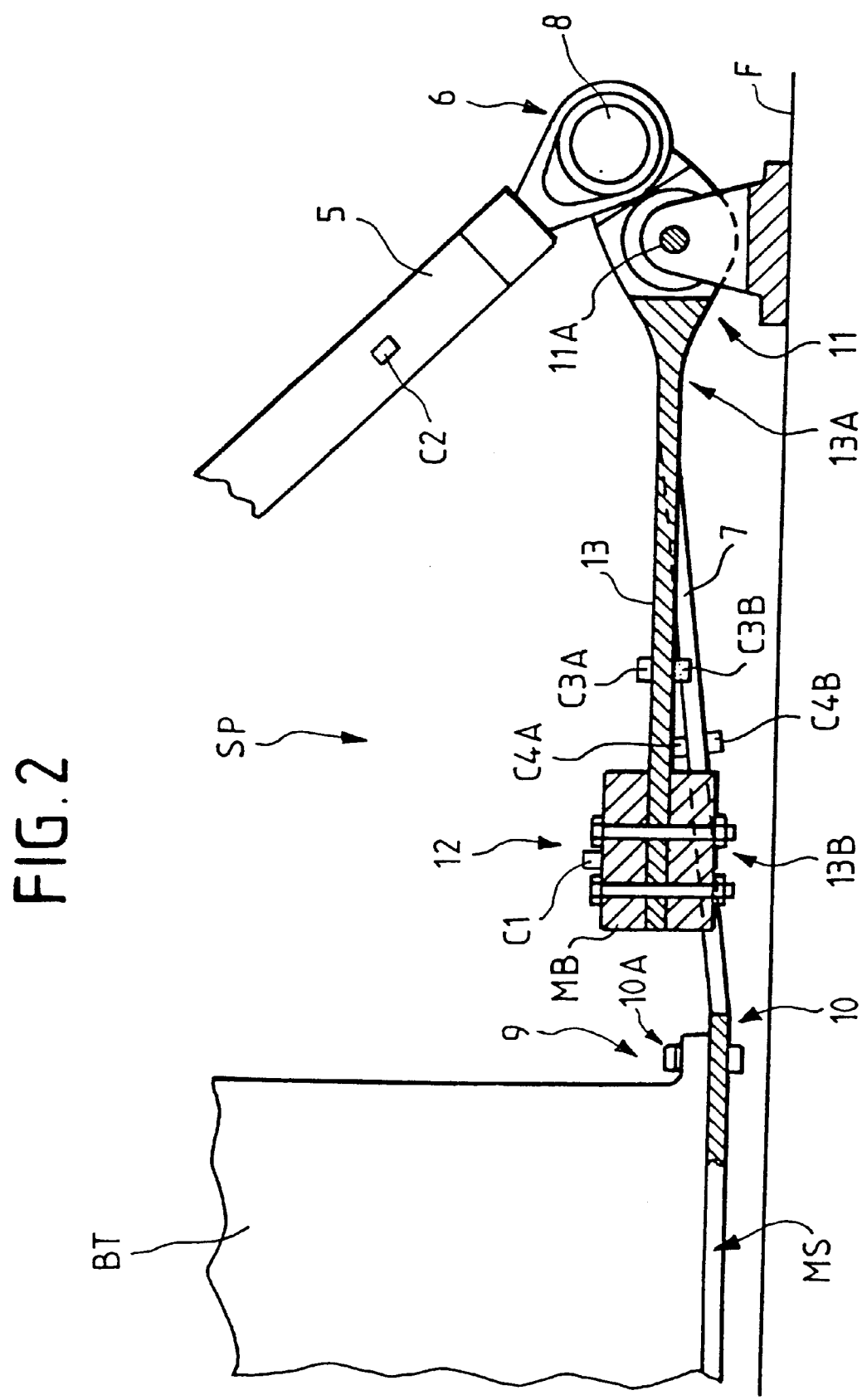
FIG. 2 partially illustrates one application of a device in accordance with the invention to a system for the suspension of a rotary wing aircraft transmission gearbox.

The device 1 in accordance with the invention and depicted diagrammatically in FIG. 1 is intended to determine the state of a vibrating structure SP depicted by way of example in FIG. 2, of a rotary wing aircraft, particularly a helicopter, not depicted.

According to the invention, said device 1 comprises:

sensors C arranged on said vibrating structure SP and capable of measuring the values of vibrational parameters specified hereinbelow;

an acquisition and processing unit 2 connected by links L to said sensors C and filtering the values measured by said sensors C relative to a frequency bΩ, b being the number of blades of a lift rotor, not depicted, of the rotary wing aircraft and Ω being its rotational speed; and a calculation unit UC connected by a link 3 to said acquisition and processing unit 2 and capable of determining the state of the vibrating structure SP, as specified hereinbelow, and of transmitting this information via a link 4 to a user device, not depicted.

As far as said user device is concerned, this may be a storage means capable of being used, for example, during an aircraft maintenance inspection.

It may also be a warning means, acoustic or visual, for alerting the pilot(s) if need be to an abnormal state of said vibrating structure SP.

According to the invention:

said sensors C are capable of measuring p vibrational parameters, p being an integer greater than or equal to n, with n being the number of main vibrational modes of said vibrating structure SP. Said n main vibrational modes are predefined and represent the essential vibrations to which the vibrating structure SP is subjected when it is in a normal state; and said parameters are, for example, speeds, displacements, forces, accelerations or strains, particularly tensile-compressive or bending strains.

Furthermore, said calculation unit UC carries out processing on the basis of the values measured by the sensors C and of estimated values of said vibrational parameters.

These estimated values may be stored in a memory of said calculation unit UC or may be transmitted thereto during processing by means, for example storage means, not depicted.

As a preference, said estimated values represent values measured by said sensors C during a preliminary operating step of said rotary wing aircraft for a normal state of said vibrating structure SP.

Furthermore, according to the invention the calculating unit UC:

calculates a correlation coefficient Q specified hereinbelow from said estimated values and said measured values of the p vibrational parameters;

compares said correlation coefficient Q with a predefined range of values; and deduces the state of said vibrating structure SP from the results of this comparison.

In a preferred embodiment, said correlation coefficient Q is calculated from the expression:

$$Q = \left[ \frac{\sum i (Umi \times \overline{Uei})}{\sqrt{\left(\sum i\, Umi \times \overline{Umi}\right) \times \left(\sum i\, Uei \times \overline{Uei}\right)}} \right]$$

in which:

the Umi terms, with i varying from 1 to p, represent the measured values of the vibrational parameters;

the Uei terms, with i varying from 1 to p, represent the estimated values of the vibrational parameters; and $\overline{Umi}$ and $\overline{Uei}$ are the complex conjugates of Umi and Uei respectively.

In this case, the calculation unit UC uses a predefined range of values for the comparison, this range generally being between 0.95 and 1.

As a consequence:

if the correlation (defined by said correlation coefficient Q) is strong, that is to say if said correlation coefficient Q is within said predefined range of values (which is formed accordingly), the only vibrations experienced by said vibrating structure SP are those generated from said main vibrational modes defined. These vibrations are therefore justified. The calculation unit UC therefore concludes from this that the vibrating structure SP is in its normal state;

otherwise, other undefined vibrations are also generated which means that the calculation unit UC detects an abnormal state of said vibrating structure SP.

Thus, the device 1 in accordance with the invention is able to effectively determine the state (normal or abnormal) of said vibrating structure SP of the rotary wing aircraft while it is operating.

In a preferred embodiment of the invention, depicted partially in FIG. 2, said vibrating structure is a system SP for the suspension of a transmission gearbox BT, for example the main transmission gearbox of said aircraft.

Said transmission gearbox BT is mounted between propulsion means and a lift rotor, neither depicted, of said aircraft essentially longitudinally to the axis of said rotor and is suspended with respect to the fuselage F of said aircraft.

This known suspension system SP of the anti-vibration type, comprises:

struts 5 distributed radially around said transmission gearbox BT, the upper ends, not depicted, of which are connected to the upper part, also not depicted, of the transmission gearbox BT, and the lower ends 6 of which are articulated to suspension leaves 7, each time via an articulation 8;

a suspension means MS connecting the lower part 9 of the transmission gearbox BT to the fuselage F of the aircraft and in particular comprising said suspension leaves 7 which are distributed radially around said transmission gearbox BT in a plane P (depicted in FIGS. 3A to 3C) essentially orthogonal to the axis of the rotor, the radially inner ends 10 of which are fixed to the lower part 9 of said transmission gearbox BT by mounting bearings 10A and the radially outer ends 11 of which are articulated to the fuselage F via an articulation 11A; and resonator means 12 respectively associated with said struts 5, each of said resonator means 12 comprising a mass support 13 which is secured by one of its ends 13A to the suspension leaf 7 connected to the associated strut 5, which has a longitudinal direction passing through the axis of the rotor, and which is equipped at its other end 13B with an oscillating mass MB.

Figure 3A:
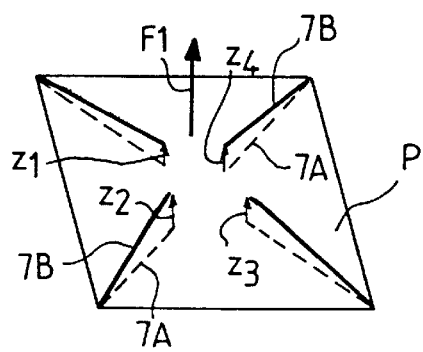
FIGS. 3A to 3C illustrate three different types of vibration applied to the suspension system of FIG. 2.
Figure 3B:
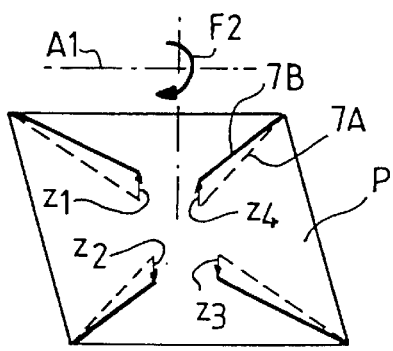
Figure 3C:
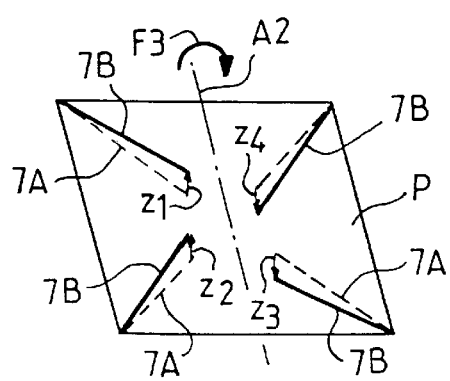

Such a suspension system SP is subjected to three main vibrational modes, namely vertical oscillation F1, roll F2 and pitch F3 which are depicted in FIGS. 3A, 3B and 3C, respectively.

Depicted diagrammatically in these FIGS. 3A to 3C is the plane P of the suspension means MS and the positions of the suspension leaves 7 both:

in the unstressed state 7A, in broken line, that is to say in the plane P; and in the stressed state 7B, in which they are subjected to one of said main vibrational modes F1, F2 and F3.

In addition, z1, z2, z3 and z4 have been used to illustrate the distance at the end 10 of said suspension leaves 7 between the unstressed state 7A and the stressed state 7B, for each of said vibrational modes.

The vertical oscillation F1 depicted in FIG. 3A corresponds to a strain that acts at right angles to the plane P, which means that $z1=z2=z3=z4=\alpha$.

The roll F2 depicted in FIG. 3B corresponds to a strain about a longitudinal axis A1 parallel to the plane P so that $-z1=z2=z3=-z4=\beta$.

Furthermore, the pitch F3 depicted in FIG. 3C corresponds to a strain about a transverse axis A2 parallel to the plane P so that $z1=z2=-z3=-z4=\gamma$.

The aforementioned parameters $\alpha$, $\beta$ and $\gamma$ represent the respective levels of said suspension system SP in vertical oscillation, roll and pitch.

According to the invention, to determine the state of said suspension system SP, that is to say to check whether or not the level of vibration thereof is due only to the aforementioned three main modes of vertical oscillation, roll and pitch, sensors C intended to measure values Z1, Z2, Z3 and Z4 or values that represent these values are arranged on said suspension system SP. These values Z1 to Z4 illustrate the displacements of the suspension leaves 7 due, not to the action of just one vibrational mode F1, F2 or F3 as was the case with the aforementioned values z1 to z4, but to the simultaneous action of all these vibrational modes F1 to F3.

These sensors C arranged to measure said values Z1 to Z4 directly or indirectly are therefore mounted either directly on the suspension leaves 7 or on elements connected to the latter and subjected to their movements.

According to the invention, said sensors may be produced and arranged in various ways.

As can be seen in FIG. 2, for each of the values Z1 to Z4, use may be made of:

a sensor C1 arranged on the oscillating mass MB and capable of measuring acceleration thereof;

a sensor C2 arranged on the strut 5 and capable of measuring a tensile-compressive strain;

a sensor capable of measuring a bending strain and comprising two strain gauges C3A and C3B which are arranged respectively on the outer faces of the mass support 13; and/or a sensor capable of measuring a bending strain and comprising two strain gauges C4A and C4B which are arranged respectively on the outer faces of the suspension leaf 7.

The device 1 in accordance with the invention, like the aforementioned, is therefore capable of determining any abnormal state of said suspension system SP. Such an abnormal state may, in particular, have as its origin:

a loosening of a mass support 13;

a crack in a mass support 13 or in a suspension leaf 7;

an increase in the play of an articulation 8 of a strut 5; and/or degradation of an elastomer of an articulation 11A or 18 or of a mounting bearing 10A.

What is claimed is:

1. A method for determining a state of a vibrating structure of a rotary wing aircraft while said aircraft is operating, said method comprising:

(a) defining n main vibrational modes of said vibrating structure, n being an integer greater than or equal to 1;

(b) defining p vibrational parameters to enable a response of said n main vibrational modes defined in step (a) to be estimated, p being an integer greater than or equal to n;

(c) determining estimated values of each of said p vibrational parameters;

(d) measuring values of said p vibrational parameters while said rotary aircraft is operating;

(e) calculating a correlation coefficient from said estimated values and said measured values;

(f) comparing said correlation coefficient with a predefined range of values; and (g) deducing said state of said vibrating structure from results of the comparison in step (f).

2. The method claimed in claim 1, wherein steps a) and b) are performed in a preliminary step, as is determining the means needed for determining said estimated values, and the remaining steps are performed in a subsequent step while said rotary wing aircraft is operating.

3. The method claimed in claim 1, wherein at least one of said p vibrational parameters correspond to at least one of a speed, a displacement, a force, an acceleration and a strain.

4. The method claimed in claim 1, wherein the measured and estimated values of said vibrational parameters are complex values.

5. The method claimed in claim 1, wherein said estimated values of the vibrational parameters are values measured on the vibrating structure while said rotary wing aircraft is operating, for a normal state of said vibrating structure.

6. The method claimed in claim 1, wherein said correlation coefficient corresponds to the difference between a first term obtained from said estimated values and a second term obtained from said measured values.

7. A method for determining a state of a vibrating structure of a rotary wing aircraft while said aircraft is operating, said method comprising:

(a) defining n main vibrational modes of said vibrating structure, n being an integer greater than or equal to 1;

(b) defining p vibrational parameters to enable a response of said n main vibrational modes defined in step (a) to be estimated, p being an integer greater than or equal to n;

(c) determining estimated values of each of said p vibrational parameters;
(d) measuring values of said p vibrational parameters while said rotary aircraft is operating;
(e) calculating a correlation coefficient from said estimated values and said measured values;
(f) comparing said correlation coefficient with a predefined range of values; and
(g) deducing said state of said vibrating structure from the results of the comparison in step (f);
wherein said correlation coefficient Q is calculated from the expression:

$$Q = \left( \frac{\sum i(Umi \times \overline{Uei})}{\sqrt{\left(\sum i\, Umi \times \overline{Umi}\right) \times \left(\sum i\, Uei \times \overline{Uei}\right)}} \right)$$

in which:
the Umi terms, with i varying from 1 to p, represent the measured values of the vibrational parameters;
the Uei terms, with i varying from 1 to p, represent the estimated values of the vibrational parameters; and
$\overline{Umi}$ and $\overline{Uei}$ are the complex conjugates of Umi and Uei respectively.

8. The method claimed in claim 7,
wherein said predefined range of values is between 0.95 and 1.

9. The method claimed in claim 1,
wherein said vibrating structure is a suspension system (SP) for a transmission gearbox of said rotary wing aircraft, said transmission gearbox being mounted between propulsion means and a lift rotor of said aircraft and approximately longitudinal to a axis of said rotor, and being suspended with respect to the fuselage of said aircraft, said suspension system comprising:
struts distributed radially around said transmission gearbox, the upper ends of which are connected to the upper part of the transmission gearbox, and the lower ends of which are articulated to suspension leaves;
a suspension means connecting the lower part of the transmission gearbox to the fuselage of the aircraft and comprising said suspension leaves; and
resonator means associated with said struts respectively.

10. The method claimed in claim 9,
wherein at least one of said vibrational parameters is measured on at least one of the following elements of said suspension system: a strut, a suspension leaf, a mass support and an oscillating mass of a resonator means, said resonator means comprising an oscillating mass connected by a mass support to a suspension leaf.

11. A device for implementing the method specified in claim 1,
which comprises:
sensors arranged on said vibrating structure and capable of measuring the values of said vibrational parameters; and
a calculation unit receiving the values measured by said sensors and determining, from these and from estimated values of the vibrational parameters, the state of said vibrating structure.

12. A device as claimed in claim 11,
which additionally comprises means which filter the values measured by said sensors, relative to a frequency bΩ, b being the number of blades of the rotary wing aircraft lift rotor and Ω being its rotational speed.

13. The method according to claim 7, wherein said vibrating structure is a suspension system for a transmission gearbox of said rotary wing aircraft, said transmission gearbox being mounted (i) between propulsion means and a lift rotor of said aircraft and (ii) longitudinal to an axis of said rotor, and said transmission gearbox is suspended with respect to a fuselage of said aircraft, wherein said suspension system comprises:
struts distributed radially around said transmission gearbox, said struts having upper ends which are connected to an upper part of the transmission gearbox and lower ends which are articulated to suspension leaves of a suspension means, said suspension means connecting the lower part of the transmission gearbox to the fuselage of the aircraft; and
resonator means connected with said struts.

14. The method according to claim 13, wherein said resonator means comprises an oscillating mass connected by a mass support to said suspension leaves and wherein at least one of said vibrational parameters is measured on at least a respective one of said struts, said suspension leaves, said mass support, and the oscillating mass.

15. A device for implementing the method recited in claim 7, said device comprising:
sensors arranged on said vibrating structure for measuring values of said p vibrational parameters;
a calculation unit for receiving the measured values from said sensors and for determining the state of said vibrating structure from both the measured values and estimated values of the vibrational parameters.

16. The device according to claim 15, further comprising filtering means for filtering the measured values from said sensors, relative to a frequency bΩ, where b is a number of blades of the rotary wing aircraft lift rotor and Ω is a rotational speed of said rotor.

* * * * *